United States Patent
Miles

(10) Patent No.: US 7,774,850 B2
(45) Date of Patent: *Aug. 10, 2010

(54) COPY PROTECTION SYSTEM FOR DATA CARRIERS

(75) Inventor: Anthony Miles, Banbury (GB)

(73) Assignee: First 4 Internet Ltd., Banbury, Oxon (GB)

( * ) Notice: Subject to any disclaimer, the term of this patent is extended or adjusted under 35 U.S.C. 154(b) by 1421 days.

This patent is subject to a terminal disclaimer.

(21) Appl. No.: 10/506,964

(22) PCT Filed: Mar. 10, 2003

(86) PCT No.: PCT/GB03/01006

§ 371 (c)(1),
(2), (4) Date: Apr. 20, 2005

(87) PCT Pub. No.: WO03/077246

PCT Pub. Date: Sep. 18, 2003

(65) Prior Publication Data

US 2005/0223240 A1    Oct. 6, 2005

(30) Foreign Application Priority Data

Mar. 8, 2002  (GB) ................ 0205459.1

(51) Int. Cl.
G06F 17/30 (2006.01)
G11B 11/00 (2006.01)

(52) U.S. Cl. .................. 726/26; 726/33; 369/53.21

(58) Field of Classification Search .......... None
See application file for complete search history.

(56) References Cited

U.S. PATENT DOCUMENTS 5,596,639 A    1/1997   Kikinis (Continued)

FOREIGN PATENT DOCUMENTS

| JP | 07-182766 A | 7/1995 |
|---|---|---|
| JP | 07-235130 A | 9/1995 |
| JP | 08-129828 A | 5/1996 |

(Continued)

OTHER PUBLICATIONS

Halderman "Evaluating New Copy-Prevention Techniquest for Audio CDs," Digital Rights Management Workshop 2002, Washington D.C., pp. 101-117.*

English Translation of Notification of Reasons for Refusal dated Jul. 17, 2007 in Japanese Application No. 2003-575378.

*Primary Examiner*—Jung Kim
(74) *Attorney, Agent, or Firm*—Banner & Witcoff, Ltd

(57) ABSTRACT

A data payload PD is recorded on a compact disc in a format including a lead-in indicating a track start address ATOC and a subchannel P which changes state at a payload start address AP, subsequent to the track start address ATOC. Data ED recorded at the track start address ATOC includes unrecoverable data. Where the data payload PD is an audio track, an audio-only player begins to search sequentially from the track start address ATOC until the subchannel changes state, and reproduces the audio track from that point. A data player, on the other hand, begins to reproduce data from the track start address ATOC. When the unrecoverable data is read, the read operation is aborted, as it appears that the data has been corrupted. This operation cannot be easily circumvented, because it is not normally acceptable to ignore corrupt CD-ROM data. The disc may also include a second session containing an encrypted version of the data payload PD, where each sector is encrypted using a different key which is derived from a sector address by an algorithm and requires a special player program which performs the decryption. A supervisory program prevents circumvention of the copy protection.

11 Claims, 3 Drawing Sheets

U.S. PATENT DOCUMENTS

| | | | |
|---|---|---|---|
| 6,952,479 B2 * | 10/2005 | Shavit et al. | 380/201 |
| 6,988,206 B1 * | 1/2006 | Alcalay et al. | 369/275.5 |
| 7,062,784 B2 * | 6/2006 | Sinquin et al. | 726/26 |
| 2001/0018743 A1 | 8/2001 | Morishita | |
| 2002/0159591 A1 * | 10/2002 | Heylen et al. | 380/201 |
| 2008/0212441 A1 * | 9/2008 | Babowicz | 369/83 |

FOREIGN PATENT DOCUMENTS

| | | |
|---|---|---|
| JP | 09-115242 A | 5/1997 |
| JP | 10-106145 A | 4/1998 |
| JP | 2000-105970 A | 4/2000 |
| JP | 2000-348435 A | 12/2000 |
| JP | 2002-208137 A | 7/2002 |
| WO | 9801852 A1 | 1/1998 |
| WO | WO 98/52194 A | 11/1998 |
| WO | WO 00/74053 A | 12/2000 |
| WO | WO 01/46952 A | 6/2001 |
| WO | WO 01/80546 A | 10/2001 |

* cited by examiner

COPY PROTECTION SYSTEM FOR DATA CARRIERS

This application claims benefit of co-pending PCT application PCT/GB03/01006 filed Mar. 10, 2003, which was published in English under PCT Article 21(2) on Sep. 18, 2003, which claims the benefit of GB Application No. 0205459.1 filed Mar. 8, 2002. These applications are incorporated herein by reference in their entireties.

FIELD OF THE INVENTION

This invention concerns methods, software and formats for preventing or restricting copying of data, particularly as recorded in digital form on a carrier such as optical disc media. In this description optical disc media is intended to include compact discs (CDs), CD-ROMs and Digital Versatile Discs (DVDs), as well as similar media that may be read using electromagnetic radiation outside the visible range.

BACKGROUND OF THE INVENTION

CD audio discs contain at least a first session formatted in compliance with the well known 'Red Book', also known as Standard 908 of the International Electrotechnical Commission (IEC) entitled 'Compact Disc Digital Audio System' (Geneva, Switzerland, 1987).

CD-ROMs contain one or more sessions formatted in compliance with the 'Yellow Book' standard and normally its extension 'System Description CD-ROM XA', which includes a data retrieval structure based on ISO 9660. The 'Yellow Book' standard incorporates the 'Red Book' standard, so that CD data drives can play audio data as well as read non-audio data. Multisession CD-R and CD-RW discs comply with the Orange Book standard.

In this specification, a distinction will be made between 'audio CD players', which need only be able to read CDs complying with the Red Book standard, and 'CD-ROM drives', which are able to read CD's complying with the Yellow Book standards, and normally the Orange Book standard as well. Audio CD players are generally stand-alone devices having no other functionality than audio reproduction, although they may be integrated with other devices. CD-ROM drives are peripherals for general-purpose computers or other similar devices which are able to load and run application programs selected by the user.

The advent of recordable CDs (CD-R) has made it generally easy and inexpensive to make unauthorised copies of audio CDs and CD-ROMs; for example by copying the entire contents of an audio CD to a computer hard disc and then writing this to a CD-R. The potential loss of revenue to recording companies from such activities is considerable, and indeed its impact has already been felt. Consequently, there is a need to prevent such unauthorised copying.

Red Book compliant CDs contain a great deal of information which is not necessary purely for playing audio tracks and which is ignored by most audio-only players. Hence, one approach to preventing unauthorised copying has been to deviate from Red Book compliance in a way that is ignored by audio CD players, but causes an error in a CD-ROM drive.

Examples of this approach are described in WO 00/74053, in which selected control data is rendered inaccurate or incorrect; the Table of Contents (TOC) may identify the audio tracks as data tracks, or may incorrectly identify the position of the Lead-Out. WO 02/075735, published after the priority date of the present application, discloses identifying the first session as CD-ROM data when it actually contains audio tracks. EP 1239472, published after the priority date of the present application, also discloses the idea of identifying audio tracks as data tracks in the TOC.

However, a CD copying application running on a computer to which a CD-ROM drive is connected may be programmed to ignore inaccurate or incorrect control information, such as inaccurate TOC entries.

The techniques mentioned above are intended to prevent reading of audio tracks by a CD-ROM drive, and thereby prevent storage of the tracks on a computer and subsequent recording or distribution on some other medium. However, some users like to play audio CDs on their computers. Hence, there is also a need to provide audio tracks in such a way that they can be played on a CD-ROM drive but cannot be re-recorded or distributed.

One solution to this problem has been to provide the audio tracks in a first session which cannot be read by a CD-ROM drive, and to provide an encrypted version of the audio tracks in a second session. The encrypted tracks can only be decrypted and played by a player program which plays the audio data by converting it to audio signals.

However, in systems which use a universal encryption key or set of keys, all content encoded with the universal key(s) can be decrypted once the key(s) are discovered. If different keys are used for each carrier, some means must be devised for distributing the key appropriate to each carrier.

STATEMENT OF THE INVENTION

According to one aspect of the invention, a track is recorded on a compact disc in a format including a lead-in indicating a track start address and a subchannel which changes state at a payload start address, subsequent to the track start address. Data recorded at the track start address includes unrecoverable data.

Where the track is an audio track, an audio CD player does not ignore the track start address, but begins to search sequentially from the track start address until it detects that the subchannel changes state, and reproduces the audio track from that point. A CD-ROM drive, on the other hand, begins to reproduce data from the track start address. When the unrecoverable data is read, the read operation is aborted, as it appears that the data has been corrupted. This operation cannot be easily circumvented, because it is not normally acceptable to ignore corrupt CD-ROM data.

Preferably, the data recorded at the track start address also includes recoverable data, including a pointer to a player program stored on the compact disc. There may be a plurality of pointers to a corresponding plurality of player programs, one of the applications being selected according to the operating system of the device to which the CD-ROM drive is connected.

Preferably, the content of the track is recorded without any incorrect or inaccurate information.

A further important aspect of the invention is the ability to play the compact disc on a CD-ROM drive. This is achieved by compressing and encrypting tracks and recording the resulting data in a second, data session on the disc.

The second session data is recorded in the following manner: the data is first split into logical blocks that will fit into a 'Yellow Book' (IEC) standard CD sector (also known as a logical block). Each of these blocks is then encrypted using an encryption key derived from its logical block address (LBA) or position on the disc. The data resulting from this process is then written to the disc at this position (LBA) using conventional mastering and recording methods. This compressed data is not accessible by conventional player software.

The data is made accessible to a computer, by including in this second session a player program that is executable by the computer. The player program has the ability to locate, decrypt and decompress the data, but prevents the data from being re-recorded or distributed.

BRIEF DESCRIPTION OF THE DRAWINGS

A detailed description of the preferred embodiments will now be described with reference to the accompanying drawings, in which.

DESCRIPTION OF THE EMBODIMENTS

In an embodiment of the invention, a compact disc (CD) carries a first session conforming with the Red Book or Yellow Book standard, depending on whether its content is audio or data, except for deviations from the standard as described below.

In accordance with the standard, the first session contains a Lead-in, a program area containing one or more tracks, and a Lead-out. The tracks may all be audio tracks, in accordance with the Red Book standard, or data tracks, in accordance with the Yellow Book standard. The Lead-in includes a table of contents (TOC), containing the absolute times (ATIME) of the start of each track and of the Lead-out, and identifying the type (i.e. audio or data) of each track.

The data format of Red Book and Yellow Book standard CDs is well known, but the relevant parts are recited here for ease of understanding. Each frame of data which is modulated and recorded on the CD includes one subcode byte. Each bit of the subcode byte corresponds to a different subcode channel, labelled from P to W. The P-channel simply indicates the start and end of each track. The Q-channel contains time codes, track type and catalogue information and, in the Lead-in, the TOC. The time codes comprise ATIME, the absolute time elapsed since the start of the session, and PTIME, which decreases during a gap between tracks. Each track is preceded by a pause, normally of 2 seconds.

Data Encapsulation

Figure 1:
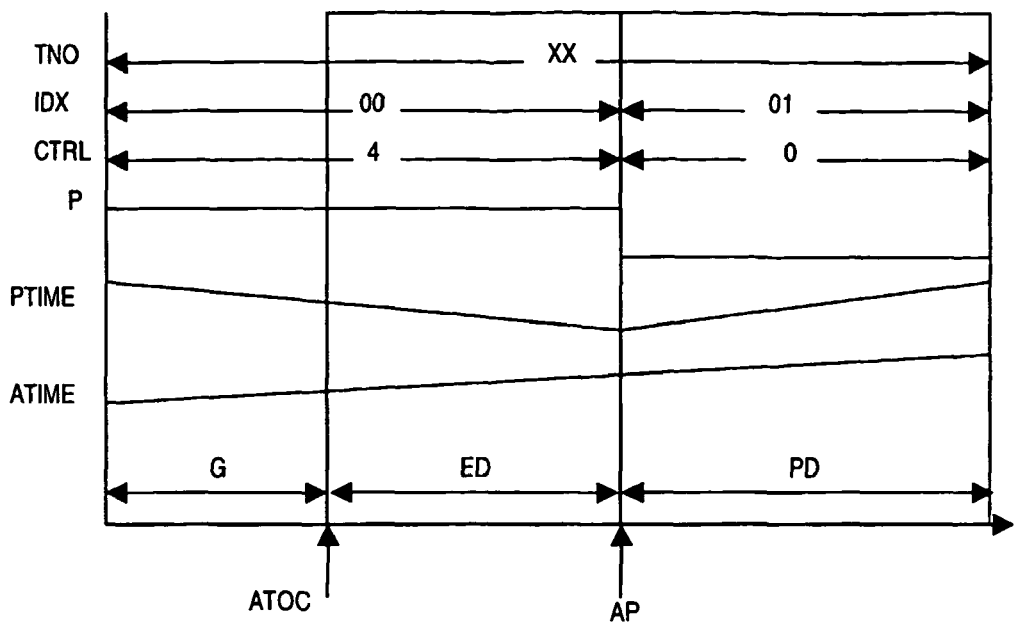
FIG. 1 is a diagram of a track format including encapsulating data, in an embodiment of the invention.

In this embodiment of the invention, the TOC indicates the absolute time position ATOC of the start of a track, which has a format as shown in FIG. 1. The track begins with a pause or gap G. At the position indicated by ATOC is located encapsulating data ED comprising a plurality CD-ROM data sectors, at least some of which contain unrecoverable data.

The unrecoverable data may have one or more of sync information, error detection code (EDC) or error correction code (ECC) corrupted to the extent that the data is unrecoverable. Alternatively, an incorrect value of ATIME may be written in each sector header, while the EDC and the ECC indicate that this value is correct.

The encapsulating data ED is followed sequentially at an absolute time position AP by payload data PD, which conforms entirely with the appropriate Red or Yellow Book standard for the relevant track type. The track type is indicated as data in the TOC.

The P channel bit stays high at the position ATOC, but goes low at the position AP. At this point, the value of PTIME begins to increment, the index IDX changes from 00 (indicating a pause) to 01 (indicating a track). The control channel CTRL has initially the value 4, indicating a data track, and after AP has the value appropriate to the track type of the payload data PD. In this case, the payload data is audio data, so CTRL changes to the value 0. Throughout this period, the track number TNO stays the same (indicated as the value XX in FIG. 1). This format may be applied to each track in a session, or only to some tracks.

When the track is played by a CD-ROM drive, the drive reads the position ATOC from the TOC and starts reading at that position. When the unrecoverable data is read, an error condition is generated and the data reading operation is aborted.

When the track is played by an audio CD player, the player starts to look for the track at the position ATOC but also examines other control data, such as the P channel and the index IDX, to determine the start position of the track. The player therefore starts to read the track from the time AP, thereby avoiding the encapsulating data ED and playing the track as a normal audio track.

By this method, a CD-ROM drive encounters an error in the data itself, rather than in the control information. The method cannot be circumvented simply by ignoring all data errors, because there may be unintentional data errors elsewhere on the CD which cannot be ignored.

The payload data may be audio, video, game software or other data. In each case, a dedicated player may be able to find the payload start position AP and to ignore the encapsulation data ED, but a CD-ROM drive will attempt to read the encapsulation data ED and report a data error.

Encrypted Second Session

Figure 2:
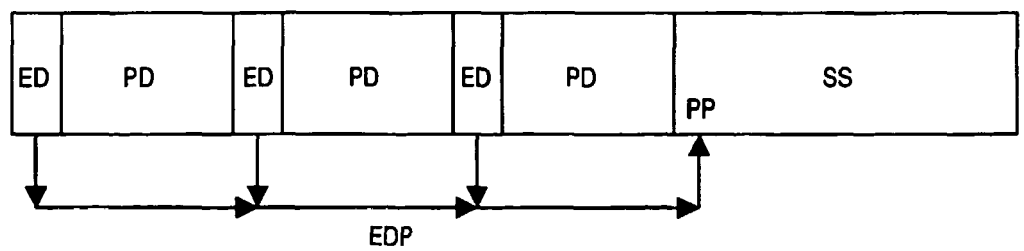
FIG. 2 is a diagram showing pointers in the encapsulating data to second session data.

On the other hand, it is desirable to allow the CD-ROM player to play tracks in such a way that they cannot be re-recorded or distributed. This is facilitated in the embodiment by one or more pointers, contained within one or more recoverable sectors of the encapsulation data ED, indicating the position on the CD of a player program which is able to play tracks contained within a second session on the CD. This is illustrated in FIG. 2, where a set of tracks within the first session each contains encapsulation data ED including a pointer EDP to a location within the second session SS where a player program PP is stored. The pointers are copies of the ISO 9660 Primary Volume Descriptor (PVD), Secondary Volume Descriptor (SVD) and Volume Set Terminator (VST) variables, which are stored in sectors 16-18 relative to the start of each track.

The second session SS conforms to the IEC 'Yellow Book' standard and the IEC 'Orange Book' standard for multi-sessions. This session contains the player program and any associated files, which are accessible and/or executable by the computer operating system and also encrypted data files containing the tracks, these latter files not being accessible or playable, except by the player program. For example, when a protected disc is viewed by a PC file manager only the player program and any files directly associated with the program will be visible.

Figure 3:
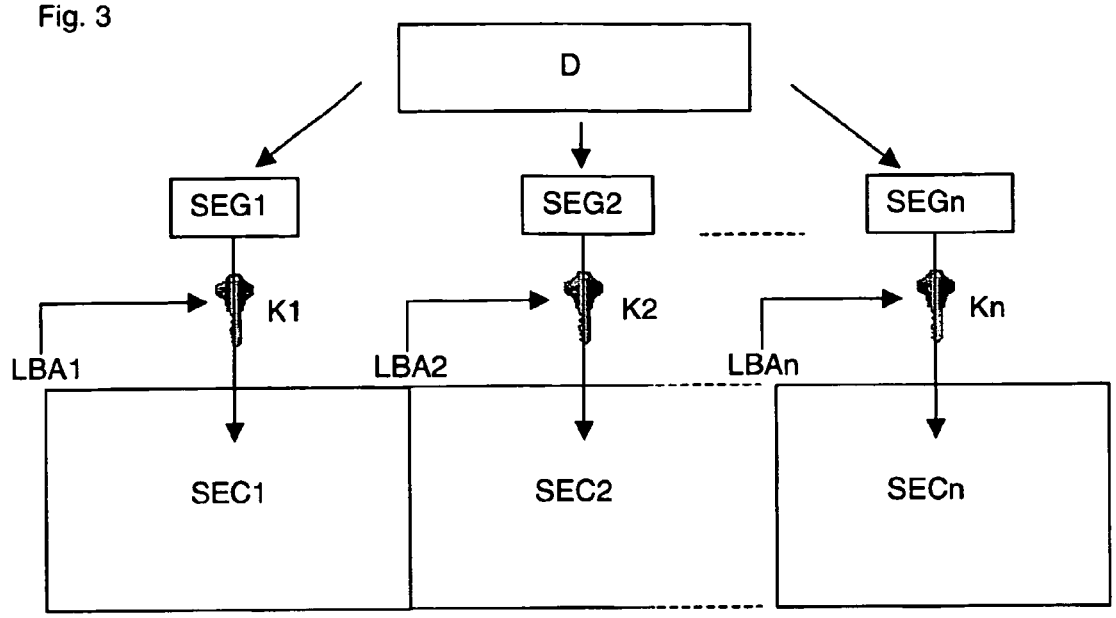
FIG. 3 is a diagram illustrating an encryption scheme used for the second session data

The encryption method will now be described with reference to FIG. 3. The data D is divided into segments SEG1 to SEGn allocated to corresponding sectors SEC1 to SECn having corresponding logical sector addresses LBA1 to LBAn within the second session area of the disc. For each sector, an algorithm is used to derive an encryption key Ki from the logical sector address LBAi of the start of that sector. Preferably, a different encryption key is derived for each sector. The corresponding segment SEGi is encrypted using the respective encryption key Ki, compressed, and recorded in that sector SECi.

Each sector on the disc normally contains 2048 bytes of consecutive encrypted digital data, each sector being encrypted with a different key. This block size is dictated by the Yellow Book standard, but in principle, data may be encrypted using any convenient block size. Using too large a block size is undesirable, as it would result in less variation in the encryption; this should be avoided. The logical sector address LBA1 corresponding to the start of each track is known to the player program, this data being hidden within the player program code or at a location on the disc known to the player program. The player code also includes the algorithm in compiled form.

The data D may be spread over several consecutive sectors SEC1 to SECn. A particular track will normally comprise many thousand consecutive sectors on the disc. Thus, when a track is selected, the player program knows the start logical sector address LBA1 and can derive the key K1 to allow data from the first sector SEC1 to be decrypted. Having read the first sector, the player program knows that the next sector starts at LBA2 consecutive to the last LBA of the first sector SEC1. Knowing LBA2, the player program can use the algorithm to derive the new key K2 and so decrypt data in the second sector SEC2. In this way, the player program can decrypt consecutive sectors, each time deriving a new key. In an alternative embodiment, sectors may be randomly addressed, but it is then necessary to know explicitly the start address of each sector.

The encryption system in this embodiment has a number of advantages over known systems. If an unauthorized copier discovers both LBA1 and K1, this only allows the first sector SEC1 to be recovered. The key K2 to the next consecutive sector SEC2 will normally be completely different. The algorithm used to derive the keys is compiled, either within the player program or accessible by the player program, and cannot easily be analysed.

Further, if by some means the consecutive encrypted segments are copied, for example to a hard disc and the player program is run and directed to the first sector, it will generate wrong keys for each sector because it would need to know the original sector addresses LBA of the copied material. The sectors occupied on the hard disc will almost certainly differ from those on the original compact disc. Hence, the copied material will not be decrypted by the player program.

Each segment SEG is preferably compressed using an appropriate compression algorithm before being recorded in the corresponding sector SEC. In the case of audio data, this advantageously reduces the space required for the second session SS and therefore allows more tracks to be included, both in the first and second sessions. The tracks need not be identical between the first and second sessions; for example, bonus tracks may be available in one session but not the other.

Supervisory Program

Preferably, a disc produced according to the embodiment contains hidden software that is activated when the computer operating system first accesses the disc; this may be done automatically using an 'autorun' function of the operating system. The software instantiates a memory resident supervisory program that monitors access to the protected disc. When the disc is removed, the supervisory program is removed from the memory of the PC. The supervisory program is also designed to monitor the activity of the disc, including disc speed and disc access type (digital or audio) and ensures reliable playback of the disc content.

Figure 4A:
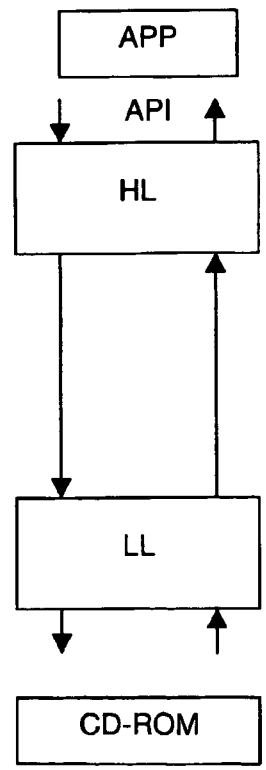
FIG. 4a is a diagram of a driver chain between an application and a CD-ROM drive.
Figure 4B:
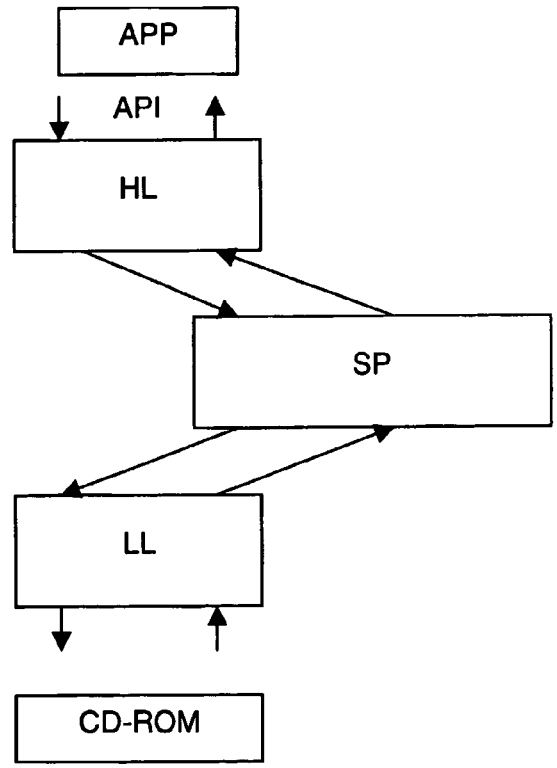
FIG. 4b is a diagram showing the insertion of a supervisory program in the driver chain.

The supervisory program inserts itself or part of itself into the operating system driver chain. As illustrated in FIG. 4b, a driver chain is a computer operating system feature, where an application APP communicates with a higher level HL of the chain. This higher level HL communicates with a lower level LL which communicates with the CD-ROM drive. The driver chain presents a standard application program interface API to the application program APP for communicating with a large variety of hardware devices. As shown in FIG. 4b, the supervisory program SP inserts itself into this driver chain by modifying the chain pointers in the next highest and lowest levels, and can therefore monitor all communications from the application program APP to the CD-ROM drive. The supervisory program SP performs command monitoring and disc monitoring functions.

Command Monitoring

The command monitoring function intercepts commands, such as SCSI or ATAPI commands, sent by the application APP to the CD-ROM drive and determines whether the commands indicate an unauthorised activity, such as the reading of data from the disc by an application that is not the player program. If an unauthorised activity is detected, the relevant command is blocked by the supervisory program and cannot continue down the driver chain to the CD-ROM. A command response is generated by the supervisory program and is returned up the driver chain to the application. The response may be an error message or dummy data, which appear to have originated from the CD-ROM drive, and prevent the application from performing the desired operation.

Disc Monitoring

The disc monitoring functions involve monitoring data read by the CD-ROM and passed along the driver chain to the application. If unauthorised activity is detected, the read operation is prevented.

The supervisory program SP may, for example calculate the average data transfer rate, disc speed or the type of read operation that is being attempted. When a disc is being played in a computer using the player program, the average playback speed of the disc will be very low, since compressed data is being read from the second session at real time. Typically, data is compressed at a ratio of about 10 to 1; therefore, the average data rate when playing the compressed data over the same period will be about 1/10 speed in this case.

The compressed data may read from the disc in blocks at a high speed (burst speed), followed by a much longer period of inactivity. The burst speed could in fact be anything up to and including the maximum read speed of the CD-ROM drive, but for very short periods. On the other hand, CD copying software typically will try to copy at the highest speed possible for a sustained period. The supervisory program monitors the average data reading speed over a predetermined period, such as ten seconds. If the average speed exceeds a threshold, then the read operation is prevented.

The supervisory program may monitor the position of the read head of the CD-ROM and thereby identify whether the first or second session is being accessed. If the first session is being accessed, the supervisory program prevents the read operation.

The read operation may be prevented by blocking the data from reaching the application. An eject command may also be sent to the CD-ROM.

The supervisory program interacts with the player program to prevent unauthorised activities. If the player program is not open, or is closed by the user while the disc is still in the CD-ROM drive, then the supervisory program sends an eject command to the CD-ROM drive. Likewise, if a protected disc is no longer present in the CD-ROM drive, the supervisory program closes itself down.

Where there is more than one protected disc accessible to the computer at the same time in different drives, the supervisory program, when launched by the insertion of a protected disc, determines whether there is another instance of itself already running. If so, the drive containing the new disc is added to a list of drives monitored by the other instance. If not, the new instance of the supervisory program is deployed. Once all of the monitored drives no longer contain a protected disc, the supervisory program removes itself from the system.

In general, the supervisory program is designed to detect any access to a protected disc other than the player program accessing the second session. If the disc is accessed in any other way the activity will be judged illegal and interventionary action will be taken by the supervisory program. The supervisory program identifies a protected disc by recognising a signature which forms part of the disc format structure, and does not prevent the copying of an ordinary disc or interfere with the general performance and/or activities of the computer.

CD Production

Figure 5:
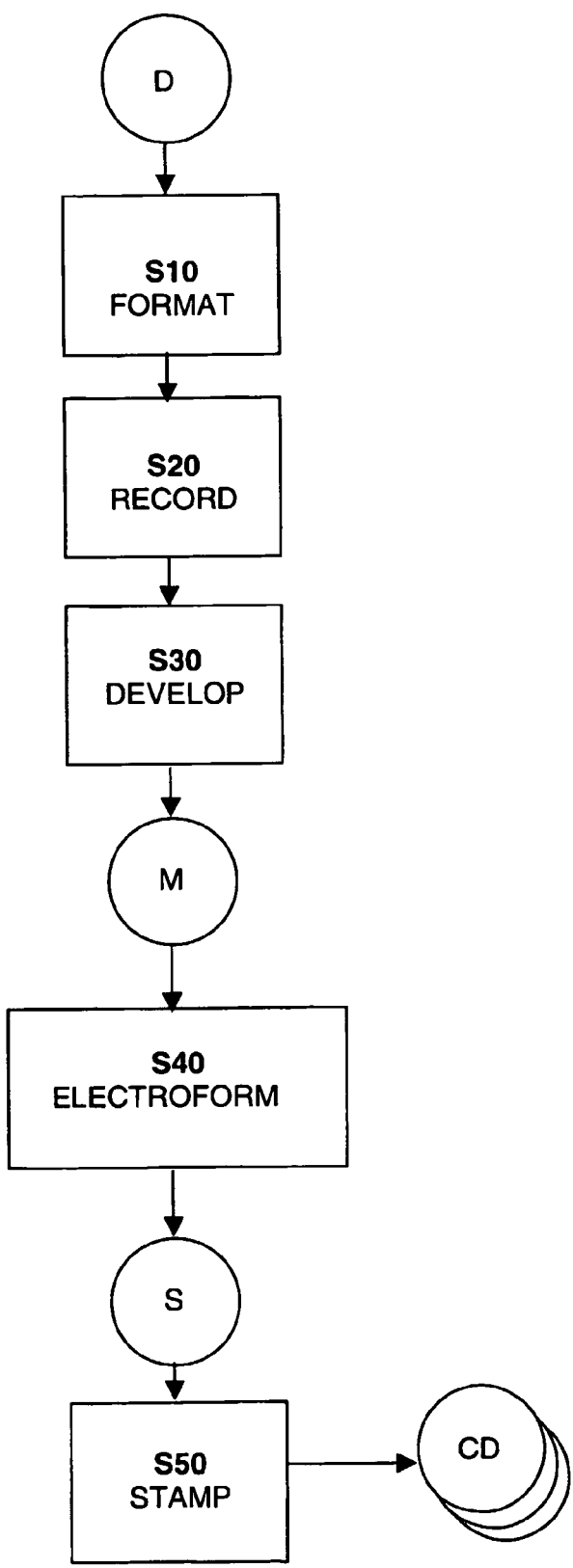
FIG. 5 is diagram illustrating the stages of manufacture of a compact disc according to the embodiment.

To produce a CD formatted according to an embodiment of the invention requires special software to be used during the mastering process, which is illustrated in FIG. 5. The source data D for one or more tracks is provided on a carrier, which may itself be a recordable CD or a digital tape. The source data is formatted (S10) by software to generate a first session and a second session in the format described above, including the player program and the supervisory program, for recording on the CD. The formatted data is recorded (S20) on a CD master, using for example a laser beam recorder which writes the data on a coated glass master. The glass master is developed (S30) to produce a metallized glass master M. The master may be used to produce one or more stampers S by an electroforming process (S40). CDs are mass-produced from the stamper S by a stamping process (S50). In an alternative embodiment suitable for low volume production, recordable CD's may be recorded directly with the formatted data.

The formatted data may be recorded as a data set for input to the recorder at a subsequent time.

Embodiments of the invention include CD production software for formatting data and/or controlling a recording process to generate one or more CD's having a format in accordance with an embodiment of the invention. Embodiments also include formatted data having a structure as defined above.

The production software may allow the algorithm that derives the keys from the sector addresses to be varied for each master M produced. Advantageously, routine variations in the algorithm used for manufacturing a given master M can result in completely different keys being derived for a given sector address. The production software modifies the code of the player program that is also recorded on the disc so that it contains the algorithm used in the encryption step, thus allowing the player program to decrypt the data session.

The above embodiments are provided purely by way of example. Alternatives, which may be apparent to the skilled person on reading the specification, may nevertheless fall within the invention as defined by the claims.

The invention claimed is:

1. An optical disc carrying at least a first session including a table of contents and a program area containing at least one track, the table of contents indicating a start position of said track, and the program area including a subchannel wherein,
   a. said track includes, at said indicated start position, a data portion containing unrecoverable data;
   b. the subchannel indicates a payload start position different from said indicated start position; and
   c. said track includes a recoverable payload at the payload start position.

2. The optical disc of claim 1, wherein the data portion includes a pointer to a player program.

3. The optical disc of claim 2, wherein the pointer indicates a position at which the player program is recorded on the optical disc.

4. The optical disc of claim 2 or claim 3, including a subsequent session containing encrypted data which can be decrypted by the player program.

5. A method of manufacturing an optical disc, comprising formatting source data to create a first session including a table of contents and a program area containing at least one track, the table of contents indicating a start position of said track, and the program area including a subchannel; and recording the formatted source data on the optical disc; wherein
   a. said track includes, at said indicated start position, a data portion containing unrecoverable data;
   b. the subchannel indicates a payload start position different from said indicated start position; and
   c. said track includes a recoverable payload at the payload start position.

6. The method of claim 5, wherein the data portion includes a pointer to a player program.

7. The method of claim 6, including recording a player program at a position on the optical disc indicated by the pointer.

8. The method of claim 6 or 7, including recording on the optical disc a subsequent session containing encrypted data which can be decrypted by the player program.

9. The method of any one of claims 5 to 7, wherein the optical disc is an optical disc master (M).

10. The method of claim 9, including manufacturing one or more playable optical discs directly or indirectly from the optical disc master.

11. The method of claim 8, wherein the optical disc is an optical disc master (M).

* * * * *